United States Patent
Suzuki

(10) Patent No.: US 11,635,058 B2
(45) Date of Patent: *Apr. 25, 2023

(54) VERTICAL BLADE HAVING A VERTICAL MAIN PART AND INWARDLY INCLINED PARTS AND A VERTICAL SHAFT WIND TURBINE USING THE VERTICAL BLADE

(71) Applicant: GLOBAL ENERGY CO., LTD., Shizuoka (JP)

(72) Inventor: Masahiko Suzuki, Shizuoka (JP)

(73) Assignee: Global Energy Co. Ltd., Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,506

(22) Filed: Sep. 20, 2022

(65) Prior Publication Data

US 2023/0014546 A1    Jan. 19, 2023

Related U.S. Application Data

(62) Division of application No. 16/972,814, filed as application No. PCT/JP2019/021478 on May 30, 2019, now Pat. No. 11,486,353.

(30) Foreign Application Priority Data

Jun. 8, 2018   (JP) .................................. 2018-110435

(51) Int. Cl.
  *F03D 3/06*       (2006.01)
  *F03D 3/00*       (2006.01)
(52) U.S. Cl.
  CPC .............. *F03D 3/005* (2013.01); *F03D 3/062* (2013.01); *F05B 2240/211* (2013.01)
(58) Field of Classification Search
  None
  See application file for complete search history.

(56) References Cited

U.S. PATENT DOCUMENTS

| 3,918,839 A | 11/1975 | Blackwell et al. |
| 4,281,965 A | 8/1981 | Stjernholm |

(Continued)

FOREIGN PATENT DOCUMENTS

| CN | 102 062 047 A | 5/2011 |
| EP | 2 696 066 A2 | 2/2014 |

(Continued)

OTHER PUBLICATIONS

Helically Stacked Darrieus orSavonius Rotor, https://salientwhiteelephant.wordpress.com/2009/03/12/helically-stacked-darrieus-rotor/ [viewed Nov. 22, 2021], Published Mar. 12, 2009, 4 pages. See Australian Examination Report.

(Continued)

*Primary Examiner* — Tulsidas C Patel
*Assistant Examiner* — S. Mikailoff
(74) *Attorney, Agent, or Firm* — Finch & Maloney PLLC

(57) ABSTRACT

A vertical shaft wind turbine that is superior in a rotational startability, even at a low wind speed, and is suited to a wind power generator that has high rotational torque. Each blade is an upper-and-lower-ends fixed type vertically long blade which is suitable for use as a wind turbine or a water turbine. The string length and thickness of an upper-and-lower-ends fixed type vertically long blade (8) that is fixed upper and lower ends to a vertical main shaft (7) gradually decrease from a main part (8) thereof to tips of the upper and lower inwardly curved inclined parts (8B, 8B), and a cross section of the main part (8A) is a lift type. A thickness of the cross-sectional shape is continuously and gradually thins from the main part (8) to the tips of the inwardly curved inclined parts (8B, 8B).

2 Claims, 14 Drawing Sheets

(56) References Cited

U.S. PATENT DOCUMENTS

| | | | |
|---|---|---|---|
| 4,449,053 A | 5/1984 | Kutcher |
| 5,203,672 A | 4/1993 | Wolf |
| 5,375,324 A | 12/1994 | Wallace et al. |
| 5,499,904 A | 3/1996 | Wallace et al. |
| 5,531,567 A | 7/1996 | Hulls |
| 7,896,609 B2 | 3/2011 | Mitchell et al. |
| 9,797,373 B2 | 10/2017 | Aihara et al. |
| 2008/0145224 A1 | 6/2008 | Mitchell et al. |
| 2013/0156585 A1 | 6/2013 | Mangano |
| 2014/0234120 A1 | 8/2014 | Aihara et al. |
| 2016/0312768 A1 | 10/2016 | Takakura |
| 2019/0093628 A1 | 3/2019 | Lin et al. |
| 2021/0095637 A1 | 4/2021 | Ito et al. |

FOREIGN PATENT DOCUMENTS

| | | | |
|---|---|---|---|
| JP | S58-214680 A | 12/1983 |
| JP | 2006-118384 A | 5/2006 |
| JP | 2006-118434 A | 5/2006 |
| JP | 2012-002069 A | 1/2012 |
| JP | 2013-147940 A | 8/2013 |
| JP | 2014-152768 A | 8/2014 |
| JP | 2017-053308 A | 3/2017 |
| JP | 2017-166325 A | 9/2017 |

OTHER PUBLICATIONS

Australian Examination Report corresponding to AU 2019282971 dated Nov. 24, 2021.
Supplementary European Search Report corresponding to EP 19814098 dated Feb. 1, 2022.

VERTICAL BLADE HAVING A VERTICAL MAIN PART AND INWARDLY INCLINED PARTS AND A VERTICAL SHAFT WIND TURBINE USING THE VERTICAL BLADE

TECHNICAL FIELD

The present invention relates to a vertical shaft wind turbine having a vertically long blade that upper and lower ends are fixed to a mounting member fixed to a vertical main shaft, and its vertically long blade and a wind power generator.

BACKGROUND OF THE INVENTION

As a vertical shaft wind turbine provided with an upper-and-lower-ends fixed type vertically long blade that upper and lower ends are fixed to a vertical shaft, for example, it is disclosed in FIG. 1 of Patent Literature 1 and FIG. 5 of Patent Literature 2.

PRIOR ART

Patent Literatures

Patent Literature 1: JP-Sho 58-214680A
Patent Literature 2: JP2012-002069A

SUMMARY OF THE INVENTION

Problems to be Solved by the Invention

In the invention disclosed in Patent Literature 1, the vertically long blade of the vertical shaft wind turbine provided with an upper-and-lower-ends fixed type vertically long blade that upper and lower ends are fixed to a vertical shaft has a same wing string length from top to bottom and is short. A vertically long blade of a vertical shaft wind turbine provided with an upper-and-lower-ends fixed type vertically long blade in FIG. 5 of Patent Literature 2 is the same.

Therefore, in a centrifugal part far from a vertical shaft, it has a disadvantages that an area that receives an airflow is small, a rotational startability is poor, and a rotational torque is small even if it rotates, so that it is disadvantageous for a wind power generation.

An object of the present invention is to improve such a defect, to provide a vertical shaft wind turbine that is superior in the rotational startability even at a low wind speed and has a high rotational torque, and to provide an upper-and-lower-ends fixed type vertically long blade used therein.

Means for Solving the Problems

The present invention has taken the following technical measures in order to solve the above problems.

(1) A vertical shaft wind turbine, comprising a vertically long blade and a vertical main shaft,
wherein the vertically long blade has a substantially vertical main part and inwardly curved inclined parts extending linearly from respective top and bottom of the substantially vertical main part in a direction of the vertical main shaft,
wherein the vertical main shaft has mounting members fixed to the vertical main shaft, and
wherein the vertically long blade is an upper-and-lower-ends fixed type vertically long blade of which tip parts of the inwardly curved inclined parts are respectively fixed to the mounting members,
a string length and a thickness of the vertically long blade are gradually reduced from the substantially vertical main part to tips of the upper and lower inwardly curved inclined parts,
a cross section of the string direction in the substantially vertical main part is a lift type,
a thickness of the cross-sectional shape is continuously and gradually thinned from the substantially vertical main part to the tips of the upper and lower inwardly curved inclined parts, and
a string length of the substantially vertical main part is in a range of 45% to 55% of a radius of rotation of the substantially vertical main part.

(2) The vertical shaft wind turbine according to (1) above, wherein, the vertical main shaft of the vertical shaft wind turbine is supported by upper and lower bearings provided in a horizontal frame at an upper part of a generator and in another horizontal frame at an upper end of a support frame respectively in the support frame formed by columns and the horizontal frames, and
the tips of the upper and lower inwardly curved inclined parts of the upper-and-lower-ends fixed type vertically long blade are respectively fixed to the mounting members fixed to the vertical main shaft between the upper and lower bearings,
wherein the upper-and-lower-ends fixed type vertically long blades are paired with two left and right blades, each pair is arranged in layers in the vertical direction to make multiple pairs,
the tips of the upper inwardly curved inclined parts of a pair of the blades of a lower layer are located in a middle of the upper and lower inwardly curved inclined parts of a pair of the blades of an upper layer, and
the tips of the lower inwardly curved inclined parts of a pair of the blades of the lower layer are located below the lower inwardly curved inclined parts of a pair of the blades of the upper layer, so that the tip of each inwardly curved inclined part is fixed to the mounting member fixed to the vertical main shaft.

(3) The vertical shaft wind turbine according to (1) above, wherein the vertical main shaft of the vertical shaft wind turbine is supported by upper and lower bearings provided in a horizontal frame at an upper part of a generator and in a horizontal frame at an upper end of a support frame respectively in the support frame formed by columns and the horizontal frames, and the tips of the upper and lower inwardly curved inclined parts of the upper-and-lower-ends fixed type vertically long blade are fixed to the mounting members fixed to the vertical main shaft between the upper and lower bearings,
wherein the upper-and-lower-ends fixed type vertically long blades make one set with three blades and are arranged around the vertical main shaft at equal intervals, and each set is arranged in layers in the vertical direction to make multiple sets, and
the tips of the upper inwardly curved inclined parts of one set of the blades of a lower layer are located in a middle of the upper and lower inwardly curved inclined parts of one set of the blades of an upper layer, and the tips of the lower inwardly curved inclined parts of one set of the blades of the lower layer are located below the lower inwardly curved inclined parts of one set of the blades of the upper layer, so that the tip of each inwardly curved inclined part is fixed to the mounting member fixed to the vertical main shaft.

(4) The vertical shaft wind turbine according to (1) above, wherein the upper mounting member is a flat plate shape, and the lower mounting member is a cylindrical shape, in the mounting members fixed to the vertical main shaft.

(5) An upper-and-lower-ends fixed type vertically long blade of which upper and lower ends of a vertically long blade are respectively fixed to mounting members fixed to a vertical main shaft of a vertical shaft wind turbine, wherein, as a shape of the vertically long blade, inwardly curved inclined parts extending linearly from respective top and bottom of the substantially vertical main part in a direction of the vertical main shaft is provided, a string length and a thickness are gradually reduced from the top and bottom of the substantially vertical main part to each of the tips of the inwardly curved inclined parts extending linearly in the direction of the vertical main shaft, a cross section of the substantially vertical main part is a lift type being a substantially fish shape, a thickness of the cross-sectional shape is continuously and gradually thinned from the substantially vertical main part to each of the tips of the inwardly curved inclined parts, and a string length of the substantially vertical main part is in a range of 45% to 55% of a radius of rotation of the substantially vertical main part.

(6) A wind power generator comprising an upper-and-lower-ends fixed type vertically long blade and a vertical main shaft that is coupled with a generator and is vertically provided on an upper surface of a support column, wherein the upper-and-lower-ends fixed type vertically long blade has a substantially vertical main part and inwardly curved inclined parts extending linearly from respective top and bottom of the substantially vertical main part in a direction of the vertical main shaft, wherein tip parts of the inwardly curved inclined parts of the upper-and-lower-ends fixed type vertically long blade are respectively fixed to mounting members fixed to the vertical main shaft, a string length and a thickness of the upper-and-lower-ends fixed type vertically long blade are gradually reduced from the top and bottom of the substantially vertical main part to each tip of the upper and lower inwardly curved inclined parts, a cross section in the string direction of the substantially vertical main part is a lift type, a thickness of the cross-sectional shape is continuously and gradually thinned from the substantially vertical main part to each of the tips of the upper and lower inwardly curved inclined parts, and a string length of the substantially vertical main part is in a range of 45% to 55% of a radius of rotation of the substantially vertical main part, and wherein a storage battery is arranged in the support column and a cord is wired between the generator and the storage battery, and wherein an antenna, a lighting, a monitoring camera, and a comprehensive control device are provided on an outer surface of the support column, and the comprehensive control device collects and analyzes data obtained from the antenna, the lighting, and the monitoring camera and controls transmission and reception via the antenna.

Advantages of the Invention

According to the present invention, the following effects can be achieved.

In the invention described in (1) above, the string length of the main part corresponding to a central portion in a height direction that becomes a centrifugal portion during rotations of the upper-and-lower-ends fixed type vertically long blade is large, so that there are effects that a wind receiving area in the centrifugal portion becomes large, and a rotation efficiency becomes high.

In addition, although the upper-and-lower-ends fixed type vertically long blade is the lift type, even at low wind speeds, starting a rotation is superior, and once starting a rotation, it allows to continue a rotation by Coanda effect even when the wind stops, in addition even with interrupted airflow, there is no significant slowdown, so that it has an effect of increasing the total rotation efficiency. Moreover, the thickness of the substantially vertical main part is thicker than that of the upper and lower part of the upper-and-lower-ends fixed type vertically long blade, so that the airflow that hits the main part passes through at high speed, and as a reaction, the rotation efficiency is increased.

Although a general vertically long blade requires a support arm to fix it to a main shaft, the upper-and-lower-ends fixed type vertically long blade in the present invention is an upper and lower ends fixed type and is fixed to the mounting member that the upper and lower ends are fixed to the main shaft, so that it is excellent in rigidity and assembly workability.

In addition, the string length of the substantially vertical main part of the upper-and-lower-ends fixed type vertically long blade is the dimensions of the range of 45% to 55% of the radius of rotation of the substantially vertical main part, so that the wind receiving area of the centrifugal portion during rotation is wide and the rotation efficiency becomes high.

If the string length is shorter than the above, the wind receiving area becomes small and the rotation efficiency becomes low. If the string length is longer than the above, the resistance during rotation becomes large and the rotation efficiency is difficult to improve.

In the invention described in (2) above, the upper-and-lower-ends fixed type vertically long blades are paired with two left and right blades and each pair is arranged in layers in the vertical direction as multiple pairs by turning so as not to overlap, so that a plurality of vertically long blades can be arranged in the vertical direction to increase the wind receiving area, and the rotational torque can be increased.

In addition, the tips of the upper inwardly curved inclined parts of a pair of the blades of a lower layer are located in a middle of the upper and lower inwardly curved inclined parts of a pair of the blades of an upper layer, and the tips of the lower inwardly curved inclined parts of a pair of the blades of the lower layer are located below the lower inwardly curved inclined parts of a pair of the blades of the upper layer, so that the tip of each inwardly curved inclined part is fixed to the mounting member fixed to the vertical main shaft, so even if a plurality of vertically long blades are arranged in layers, the overall height can be lowered.

In the invention described in (3) above, the upper-and-lower-ends fixed type vertically long blades make one set with three blades and are arranged at equal angles around the vertical main shaft in a plan view, and each set of three blades is arranged in layers on the vertical main shaft as multiple sets, so that the wind receiving area can be increased, and the rotational torque can be increased.

In addition, the tips of the upper inwardly curved inclined parts of one set of the blades of a lower layer are located in a middle of the upper and lower inwardly curved inclined parts of one set of the blades of an upper layer, and the tips of the lower inwardly curved inclined parts of one set of the blades of the lower layer are located below the lower inwardly curved inclined parts of one set of the blades of the upper layer, so that the tip of each inwardly curved inclined part is fixed to the mounting member fixed to the vertical main shaft, so even if a plurality of vertically long blades are arranged in layers, the overall height can be lowered.

In the invention described in (4) above, the upper mounting member is a flat plate shape, and the lower mounting member is a cylindrical shape, in the mounting members fixed to the vertical main shaft, so that even if the lower part of the vertically long blade is a long one located at the position of the generator, the tip part of the inwardly curved inclined part of the lower part of the vertically long blade can be fixed to the cylindrical mounting member that rotates with the vertical main shaft.

In the invention described in (5) above, as a shape of the upper-and-lower-ends fixed type vertically long blade, the inwardly curved inclined parts extending linearly from respective top and bottom of the substantially vertical main part in a direction of the vertical main shaft is provided, and the string length and the thickness are gradually reduced from the substantially vertical main part to each of the tips of the inwardly curved inclined parts extending linearly in a direction of the vertical main shaft, and the cross section of the substantially vertical main part is a lift type having a substantially fish shape, and a thickness of the cross-sectional shape is continuously and gradually thinned from the top and bottom of the substantially vertical main part to each of the tips of the inwardly curved inclined parts extending linearly in the direction of the vertical main shaft, so that the airflow passing at any position of the vertically long blade is flowed smoothly, and does not occur turbulence. In addition, as a shape of the upper-and-lower-ends fixed type vertically long blade, a string length of the substantially vertical main part is in a range of 45% to 55% of the radius of rotation of the substantially vertical main part, so that the wind receiving area is sufficient, and the air resistance during rotation can be reduced.

In the invention described in (6) above, in addition to being able to generate electricity efficiently, the antenna, the lighting, and the monitoring camera are provided on the outer surface of the support column, and the comprehensive control device that collects and analyzes these data and controls transmission and reception via the antenna is provided, so that even if the wind power generator is installed in a remote area, as a communication center, transmission/reception control by various communication devices can be performed by the own portable transmission/reception device or the like.

EMBODIMENTS OF THE INVENTION

Figure 1:
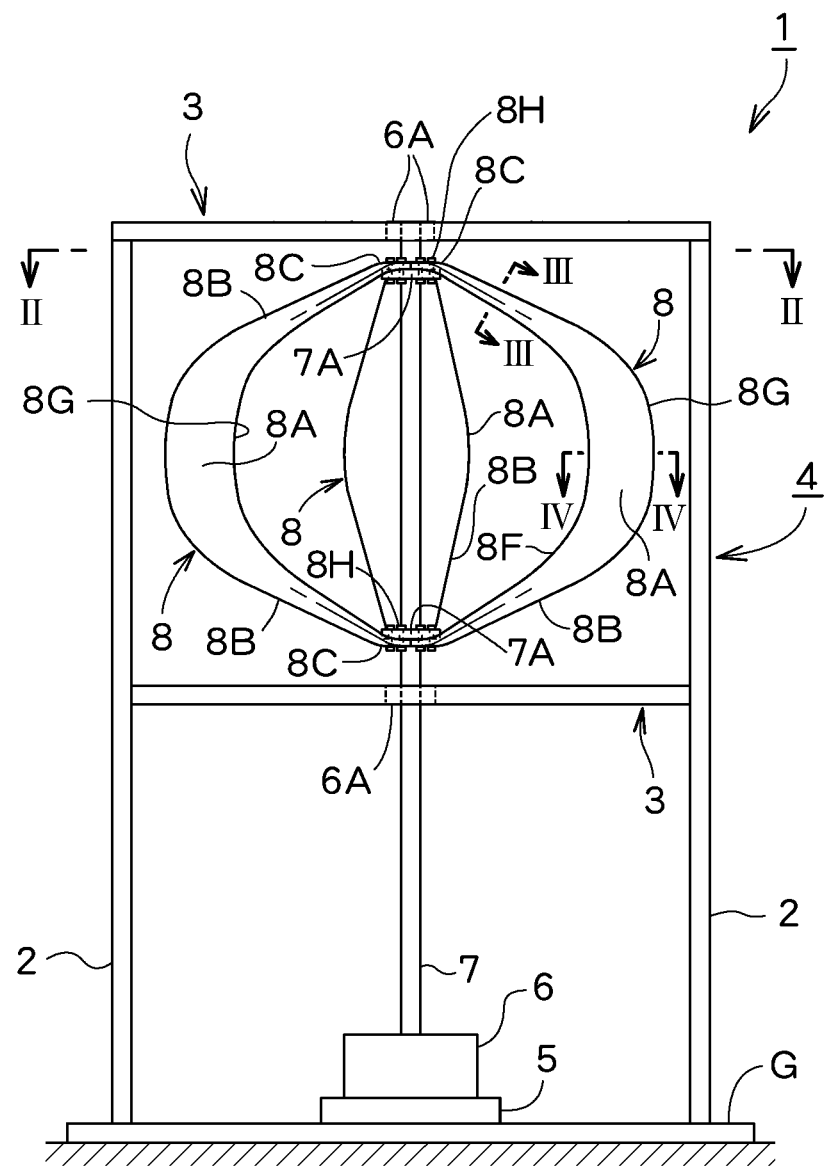
FIG. 1 is a front view showing Example 1 of the vertical shaft wind turbine according to the present invention.

Embodiments according to the present invention will be described with reference to the drawings. Regarding a vertical shaft wind turbine 1, as shown in FIG. 1, inside a support frame 4 composed of four columns 2 built on a base G and upper and lower horizontal frames 3, 3, a vertical main shaft 7 is erected in a generator 6 installed on a support base 5, the generator 6 is designed to generate electricity by rotating the vertical main shaft 7.

Figure 2:
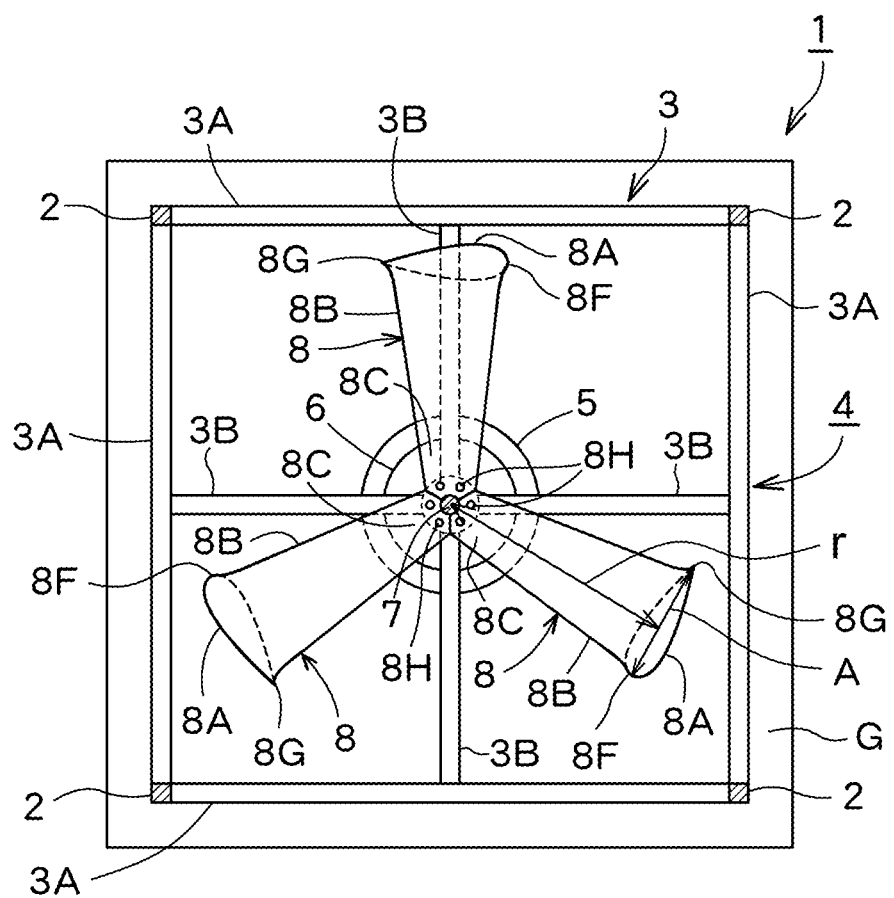
FIG. 2 is a cross-sectional plan view taken along the line II-II in FIG. 1.

Regarding the horizontal frame 3, as shown in FIG. 2, a plurality of support bars 3B, 3B are fixed in an outer frame 3A that is square in planar view, and as shown in FIG. 1, a bearing 6A that supports the vertical main shaft 7 is fixed at a central portion in the outer frame 3A.

Between the upper and lower horizontal frames 3, 3 of the upper support frame 4, the upper and lower ends of the upper-and-lower-ends fixed type vertically long blades 8, 8, 8 (hereinafter simply referred to as blades) are fixed to the flat plate shaped mounting members 7A, 7B fixed to the vertical main shaft 7 by bolts 8H.

Regarding the blade 8, as shown in FIG. 1, a main part 8A corresponding to a central part in a height direction that is a rotating centrifugal portion is substantially vertical, and a height of the main part 8A is in the range of 35% to 70% of a total height, inwardly curved inclined parts 8B and 8B extending diagonally in a direction of the vertical main shaft 7 are formed above and below the main part 8A, and ends 8C, 8C of the upper and lower inwardly curved inclined parts 8B, 8B are fixed to the flat plate shaped mounting members 7A and 7B fixed to the vertical main shaft 7 by bolts 8H.

Regarding the blade 8, as shown in FIG. 2, the three blades are arranged at equal angles of 120 degrees in planar view. The string length (chord length) and the thickness are gradually reduced from the main part 8A to the upper and lower ends 8C, 8C, the string length of the substantially vertical main part 8A is almost twice with respect to the string lengths of the ends 8C, 8C, as a result of several experiments, the string length of the main part 8A is in the range of 45% to 55% of the radius of rotation of the main part 8A, specially 50% is preferable, and if the string length of the main part 8A is smaller than the range above, the wind receiving area of the blade 8 is small and the rotation efficiency does not increase. In addition, if the string length of the main part 8A is larger than the range above, the turbulent flow received by the blade 8 during rotation becomes large, and the rotation efficiency does not increase.

Figure 4:
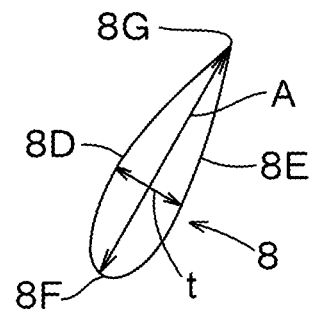
FIG. 4 is an enlarged cross-sectional view taken along the line IV-IV in FIG. 1.

In addition, the string length (chord length) A and the thickness t of a cross section of the main part 8A are shown in FIG. 4. The string length A is the length of the chord connecting the front edge 8F and the rear edge 8G, and the thickness t is the thickest part in the cross section of the main part 8A shown in FIG. 4.

Further, the radius of rotation r of the main part 8A is shown in FIG. 2. The radius of rotation r is the length of the line orthogonal to the chord connecting the front edge 8F and the rear edge 8G from the center of the vertical main shaft 7.

The vertical dimension of the blade 8 in FIG. 1 is 1.4 times or more the radius of rotation of the substantially vertical main part 8A, if it is smaller than the above, the wind receiving area of the blade 8 is small and the torque is small, so that the longer one is preferable. Although the length of the substantially vertical main part 8A during rotation of the blade 8 is shown as approximately 50% of the total height of the blade 8, the longer one is preferable. By means of this, the wind receiving area in the rotating centrifugal portion can be increased and the rotation efficiency is increased. However, it is not limited to this value.

Figure 3:
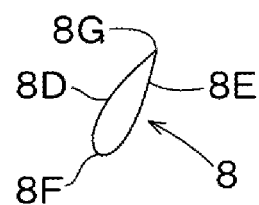
FIG. 3 is an enlarged cross-sectional view taken along the line in FIG. 1.

FIG. 3 is an enlarged cross-sectional view taken along the line in FIG. 1, and FIG. 4 is an enlarged cross-sectional view taken along the line IV-IV in FIG. 1. In FIGS. 3 and 4, the maximum thickness of the substantially vertical main part 8A of the blade 8 is a dimension in the range of 20% to 35% of the maximum string length in the substantially vertical main part 8A, a cross section of the substantially vertical main part 8A is a symmetrical substantially fish shape, and front edge 8F and rear edge 8G of the cross section are formed in a lift type arranged so as to be located on a rotating track.

In addition, the thickness of the blade 8 is formed so as to gradually decrease from the substantially vertical main part 8A to the upper and lower ends 8C and 8C, and as shown in FIGS. 3 and 4, the same cross-sectional shape is formed from the substantially vertical main part 8A to the upper and lower ends 8C and 8C. As a result, turbulence of an airflow passing through the surface is less likely to occur at any position.

The vertical shaft wind turbine 1 configured as described above easily starts rotating in the state of FIG. 1 in an airflow having a low wind speed from any direction. When the rotation is started, a high speed airflow due to Coanda effect passes through from the front edge 8F to the rear edge 8G of the entire blade 8, and a high speed rotational force is generated as a reaction.

In the substantially vertical main part 8A, the thickness and the string length are large, so that the blade 8 rotates at high speed by centrifugal force, and the high speed airflow passes through from the rear edge 8G to a backwards, the blade 8 is strongly attracted to the direction of the front edge 8F as a reaction.

When the blade 8 rotates, an airflow inside a rotating circular arc is pulled out to an outward direction of the blade 8 by the centrifugal force due to the high speed rotation of the blade 8, and the air pressure of an inside of the rotating blade 8 decreases.

Along with this, an atmospheric pressure enters the inside of the rotating blade 8 from the outer peripheral portion. That is, a pressure is applied to the inside and outside of the blade 8, and the blade 8 advances in the rotation direction.

When the air around the vertical main shaft 7 is sucked outward and the pressure around the vertical main shaft 7 becomes negative pressure, the airflow enters an inside from a lower part of outside, and the airflow that is become lighter due to the negative pressure rises and goes out like a tornado, the blade 8 is strongly pulled in the direction of rotation as a reaction and rotates with high efficiency.

The upper and lower inwardly curved inclined parts 8B and 8B of the blade 8 may be orthogonal to the substantially vertical main part 8A, but as shown in FIG. 1, when the inwardly curved inclined parts 8B and 8B are inclined inward at about 30 degrees with respect to the substantially vertical main part 8A, a rigidity against a rotational centrifugal force and other external forces becomes large.

In addition, as shown in the cross section of FIGS. 3 and 4, an inner side surface 8D of the blade 8 is close to a straight line from the front edge 8F to the rear edge 8G, an outer side surface 8E is a lift type having a front part bulging outward, and the cross-sectional shape is the same from the substantially vertical main part 8A to the tip while reducing the cross-sectional shape, so that noise is less likely to occur and efficient high speed rotation can be performed because the airflow passing through the surface of the blade 8 is equalized.

In FIG. 1, the number of blades 8 is three, but it may be two. If the number of blades 8 exceeds 5, an airflow interference generated by the blades 8 may occur during a high speed rotation, so that there is a risk that noise will be generated and the rotation efficiency will decrease.

Figure 5:
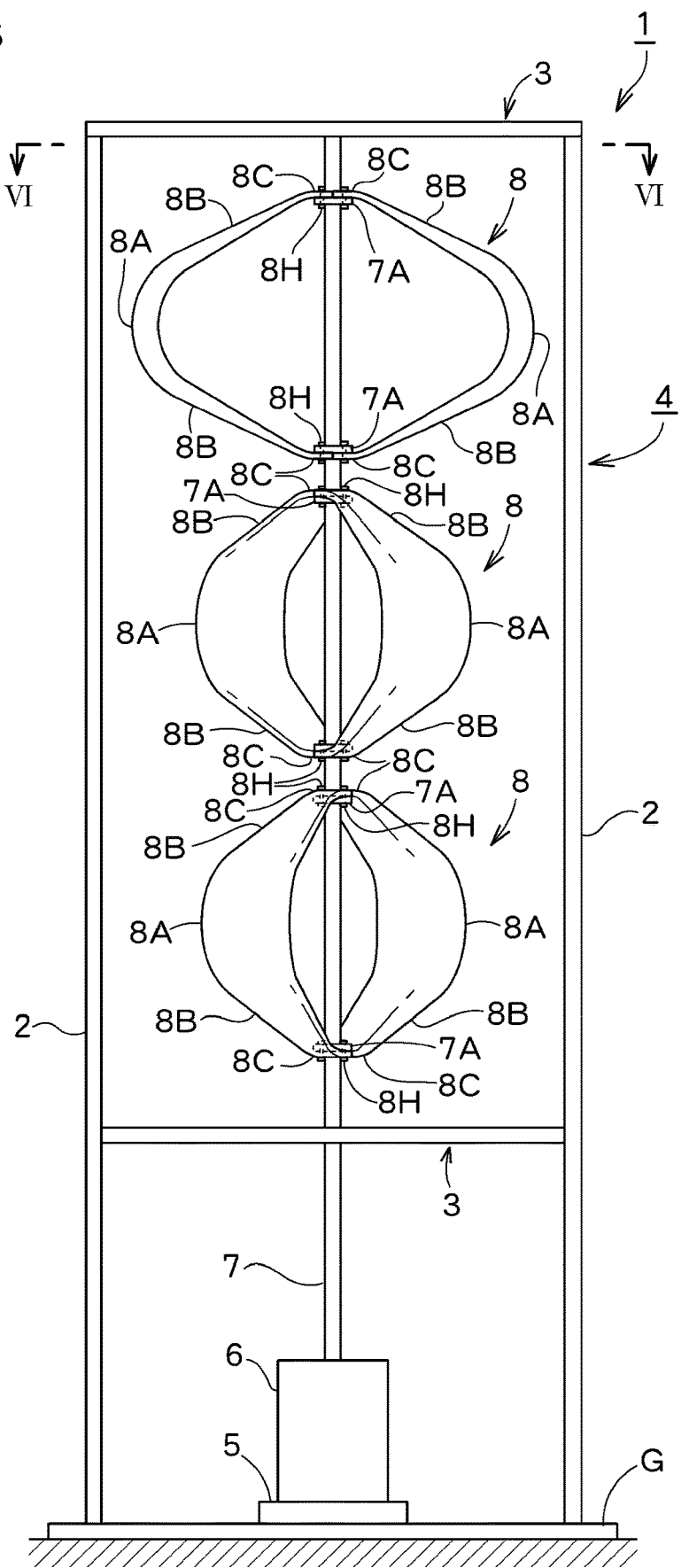
FIG. 5 is a front view showing Example 2 of the vertical shaft wind turbine according to the present invention.
Figure 6:
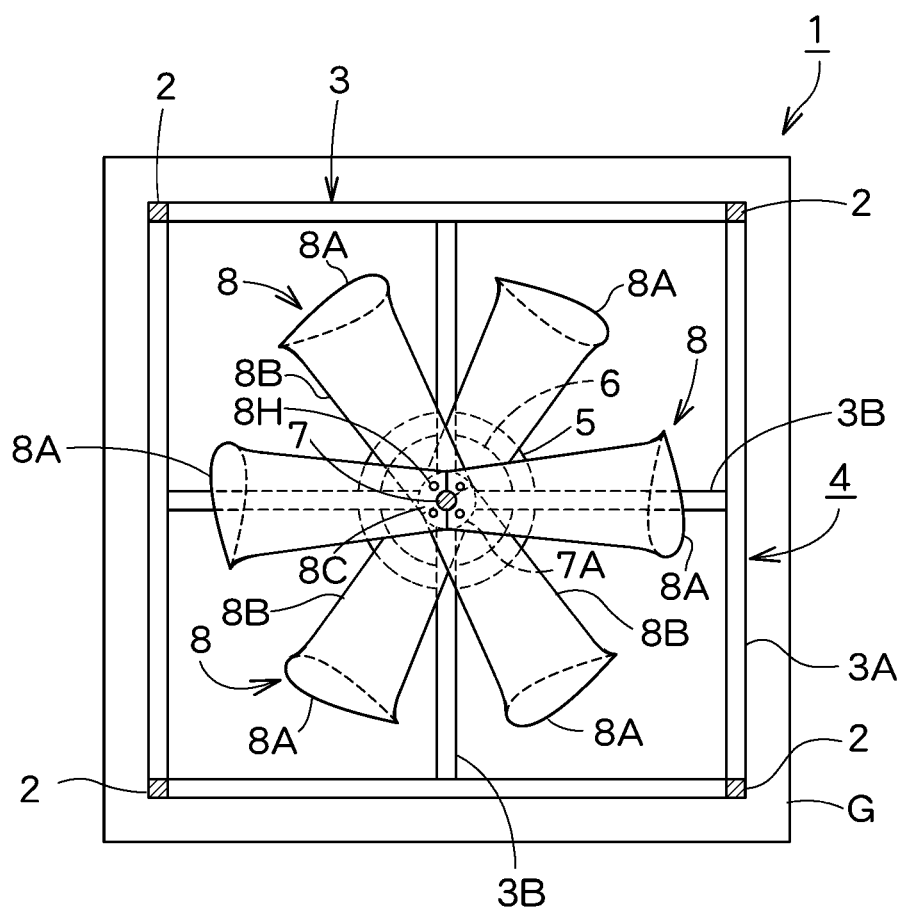
FIG. 6 is a cross-sectional plan view taken along the line VI-VI in FIG. 5.

FIG. 5 is a front view showing Example 2 of the vertical shaft wind turbine according to the present invention, and FIG. 6 is a cross-sectional plan view taken along the line VI-VI in FIG. 5. The same members as the previous example are designated by the same reference signs, and the description thereof will be omitted.

In this vertical shaft wind turbine 1, two blades 8, 8 are arranged making a pair in the same direction, and a plurality of pairs (3 pairs in FIGS. 5 and 6) of the blades 8, 8 are arranged vertically on one vertical main shaft 7, in addition, the blades 8, 8 are fixed by changing their phases at equal angles so that the blades 8 do not overlap in the upper and lower pairs.

The blades 8 may be stacked in four or more layers, and a horizontal frame 3 may be arranged between the upper and lower blades 8, 8 as necessary. In addition, in FIG. 5, the ends of the upper and lower blades 8, 8 are fixed to different mounting members 7A, 7A in the vertical direction, but it is also possible to fix the lower end of the upper blade 8 and the upper end of the lower blade 8 to one mounting member 7A.

Figure 7:
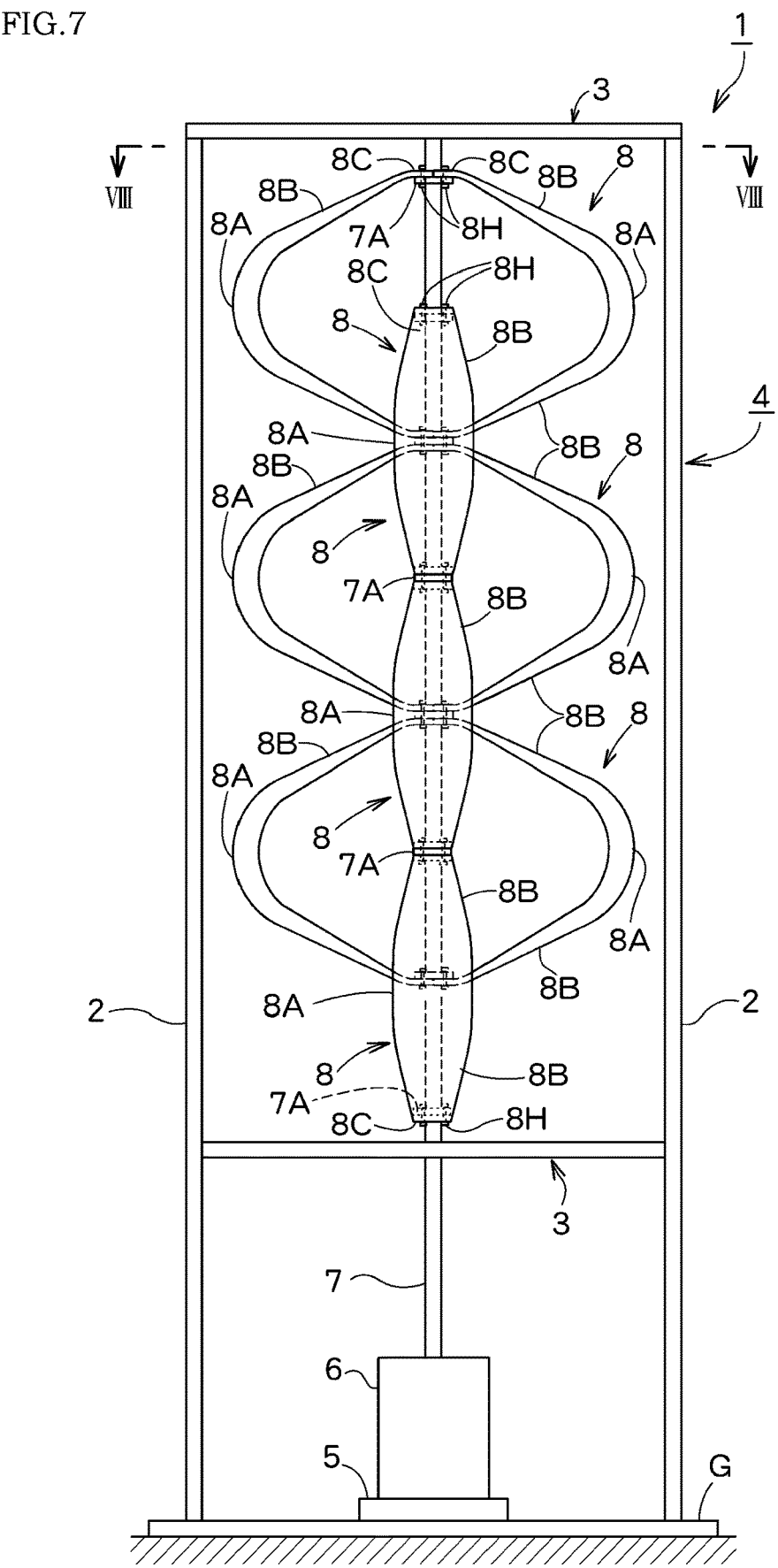
FIG. 7 is a front view showing Example 3 of the vertical shaft wind turbine according to the present invention.
Figure 8:
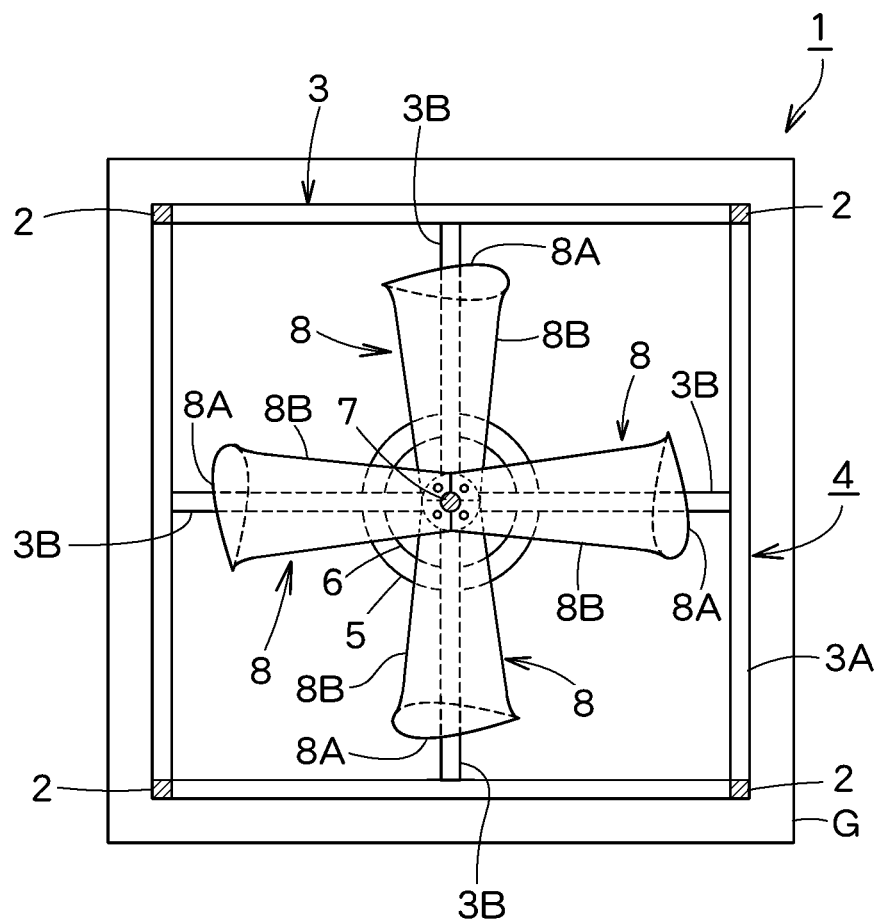
FIG. 8 is a cross-sectional plan view taken along the line VIII-VIII in FIG. 7.

FIG. 7 is a front view showing Example 3 of the vertical shaft wind turbine according to the present invention, and FIG. 8 is a cross-sectional plan view taken along the line VIII-VIII in FIG. 7. The same members as the previous example are designated by the same reference signs, and the description thereof will be omitted.

In this Example, three pairs consisting of the blades 8 that makes up one pair by the left and right are mounted in layers on the vertical main shaft 7 in the vertical direction, and another three pairs consisting of the blades 8 are mounted in layers on the vertical main shaft 7 so that the blades 8 do not overlap each other in the horizontal direction by shifting the phase, wherein, when fixing the blades 8 to the vertical main shaft 7 via the mounting members 7A, the tips of the upper inwardly curved inclined parts 8B of the blades 8 of the lower layer are located between the upper and lower inwardly curved inclined parts 8B, 8B of the blades 8 of the upper layer, and the tips of the lower inwardly curved inclined parts 8B of the blades 8 of the lower layer are located below the lower inwardly curved inclined parts 8B of the blades 8 of the upper layer.

As a result, under the same wind speed, when the number of layers of the blades 8 increases with respect to the blades 8 with one layer, the rotation speed increases as if the wind speed increases by increasing of the wind receiving area and the rotation torque increases, so that a wind power generator can generate electricity efficiently.

Figure 9:
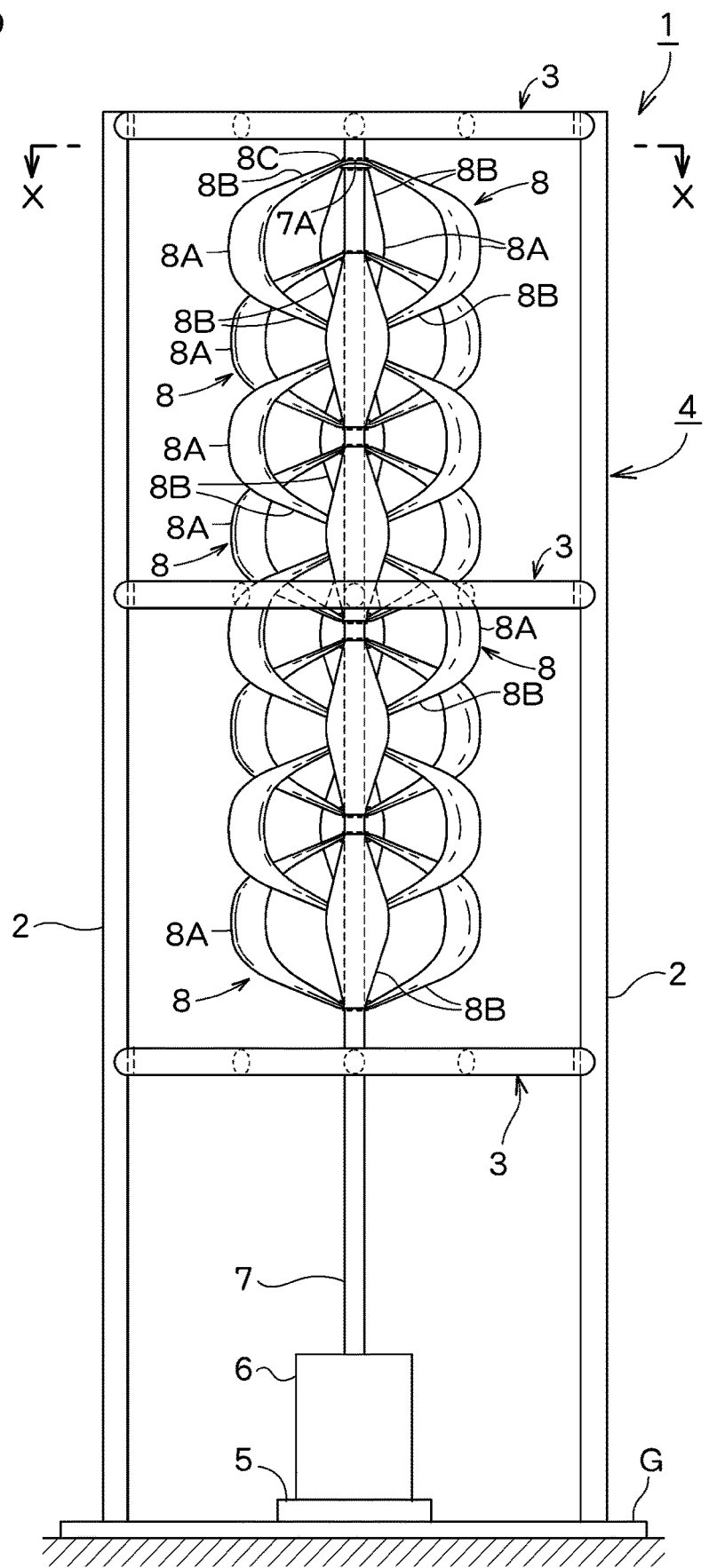
FIG. 9 is a front view showing Example 4 of the vertical shaft wind turbine according to the present invention.
Figure 10:
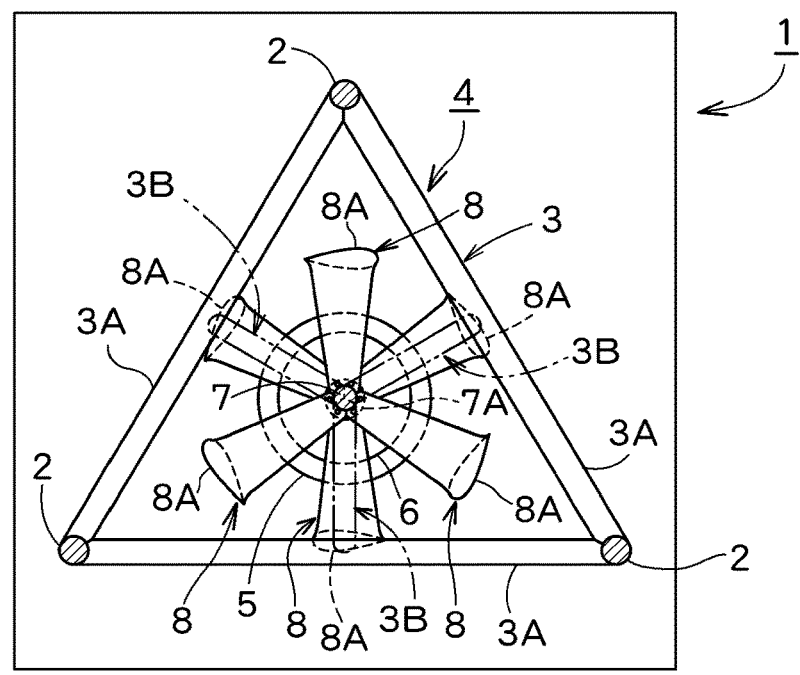
FIG. 10 is a cross-sectional plan view taken along the line X-X in FIG. 9.

FIG. 9 is a front view showing Example 4 of the vertical shaft wind turbine, and FIG. 10 is a top view thereof. The same members as the previous example are designated by the same reference signs, and the description thereof will be omitted. In this Example, the blades 8 are formed as one set by three blades, and a plurality of sets are arranged in layer to one vertical main shaft 7.

In addition, as shown in FIG. 10, the support frame 4 is formed as a triangle in planar view. Therefore, the number of columns 2 is small, the manufacturing cost is reduced, the seismic rigidity is excellent, and it can be commonly used for each of the above-mentioned vertical shaft wind turbine 1.

In FIG. 9, the blades 8 are fixed to the mounting member 7A as one set of three blades at equal angles toward three directions in planar view. In the state of one set of three blades, a plurality of sets are vertically arranged in layer to the vertical main shaft 7, and in the state of one set of three blades, the phases of the upper and lower layers are changed by about 60 degrees in planar view, wherein, when fixing the blades 8 to the vertical main shaft 7 via the mounting members 7A, the tips of the upper inwardly curved inclined parts 8B of the blades 8 of the lower layer are located between the upper and lower inwardly curved inclined parts 8B, 8B of the blades 8 of the upper layer, and the tips of the lower inwardly curved inclined parts 8B of the blades 8 of the lower layer are located below the lower inwardly curved inclined parts 8B of the blades 8 of the upper layer.

In the vertical shaft wind turbine 1 shown in FIGS. 7 and 9, the number of blades 8 can be increased with respect to the height of the vertical main shaft 7, and the wind receiving area can be increased, so that high rotation torque can be obtained even when rotating at low wind speed, and even in an area where the wind condition is not preferable, a vertical shaft wind turbine for an efficient wind power generator can be provided.

Figure 11:
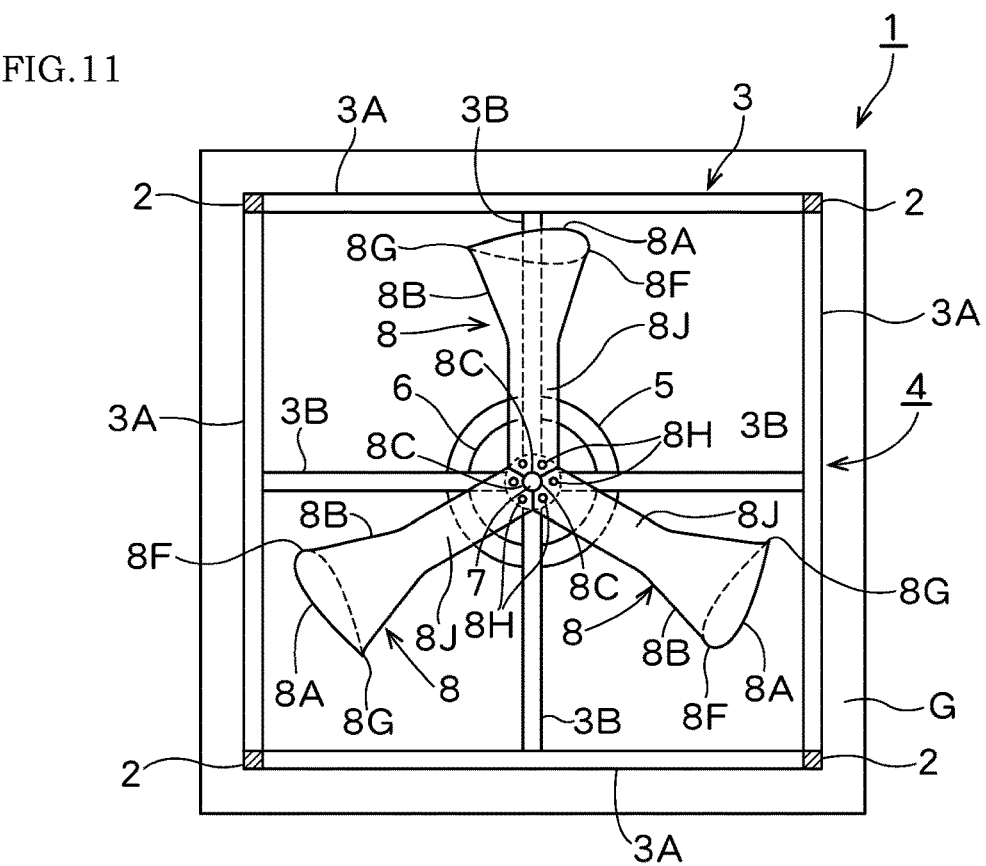
FIG. 11 is a top view showing by removing the upper horizontal frame of Example 5 of the vertical shaft wind turbine according to the present invention.

FIG. 11 is a top view showing Example 5 of the vertical shaft wind turbine in a state where the upper horizontal frame 3 of the support frame 4 is removed. The same members as the previous example are designated by the same reference signs, and the description thereof will be omitted.

In the blade 8 of this Example, extension parts 8J, 8J are formed at the tips of the upper and lower inwardly curved inclined parts 8B toward the direction of the vertical main shaft 7, inner ends of the extension parts 8J, 8J are fixed to the mounting member 7A fixed to the vertical main shaft 7.

The string lengths of the extension parts 8J, 8J are the same as or smaller than the string length of the tip of the inwardly curved inclined part 8B, and the thickness is also the same as or smaller than the thickness of the tip of the inwardly curved inclined part 8B. The string length and the cross-sectional shape of the substantially vertical main part 8A are the same as the previous examples. With this configuration, the radius of rotation of the substantially vertical main part 8A can be increased by the length of the extension portion 8J, so that the wind receiving area in the rotating centrifugal portion can be increased and the rotation torque can be increased.

Figure 12:
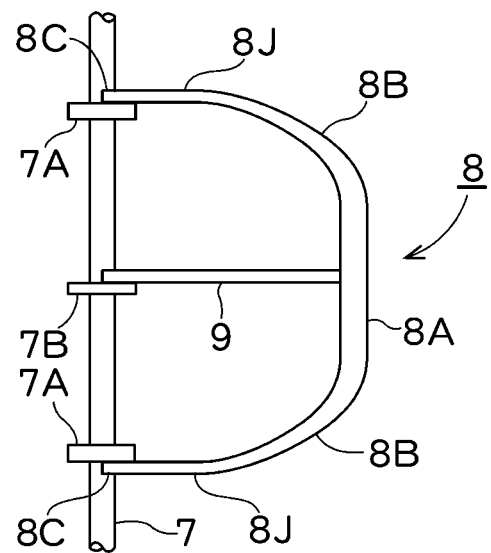
FIG. 12 is a side view showing another Example of the upper-and-lower-ends fixed type vertically long blade according to the present invention.
Figure 13:
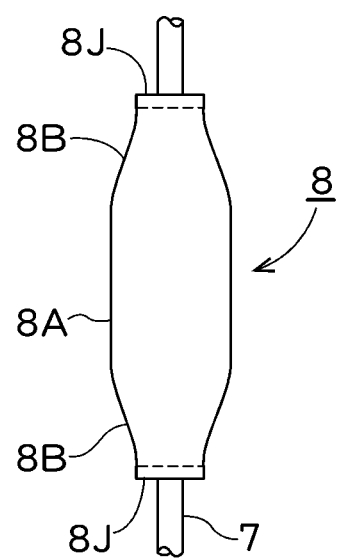
FIG. 13 is a top view of the upper-and-lower-ends fixed type vertically long blade of FIG. 12.
Figure 14:
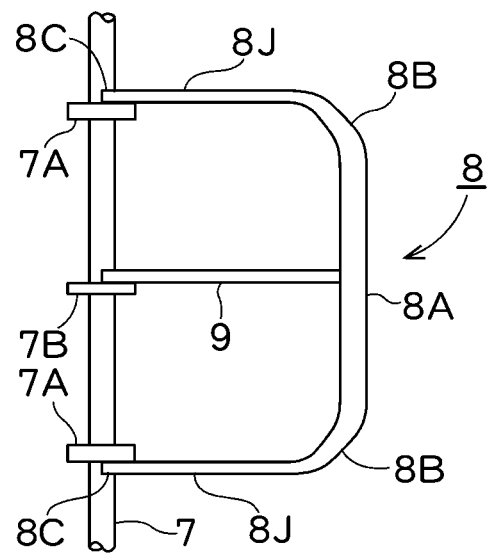
FIG. 14 is a side view showing another Example of the upper-and-lower-ends fixed type vertically long blade according to the present invention.
Figure 15:
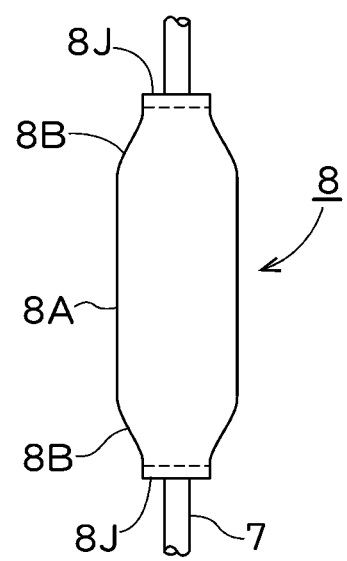
FIG. 15 is a top view of the upper-and-lower-ends fixed type vertically long blade of FIG. 14.

In addition, the vertical length of the substantially vertical main part 8A can be lengthened, and the wind receiving area of the blade 8 can be increased. When lengthening the length of the blade 8, as shown in FIG. 12, the middle of the main part 8A in the height direction and the mounting member 7B fixed to the key point of the vertical main shaft 7 may be connected by a support arm 9 in order to suppress deflection during rotation.

Figure 16:
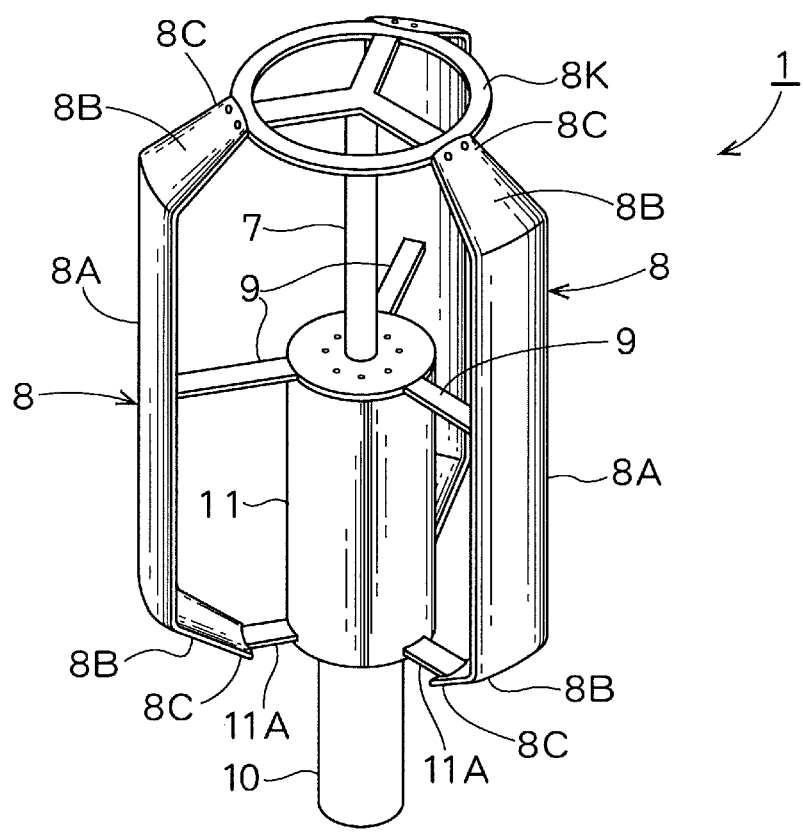
FIG. 16 is a perspective view showing Example 6 of the vertical shaft wind turbine according to the present invention.
Figure 17:
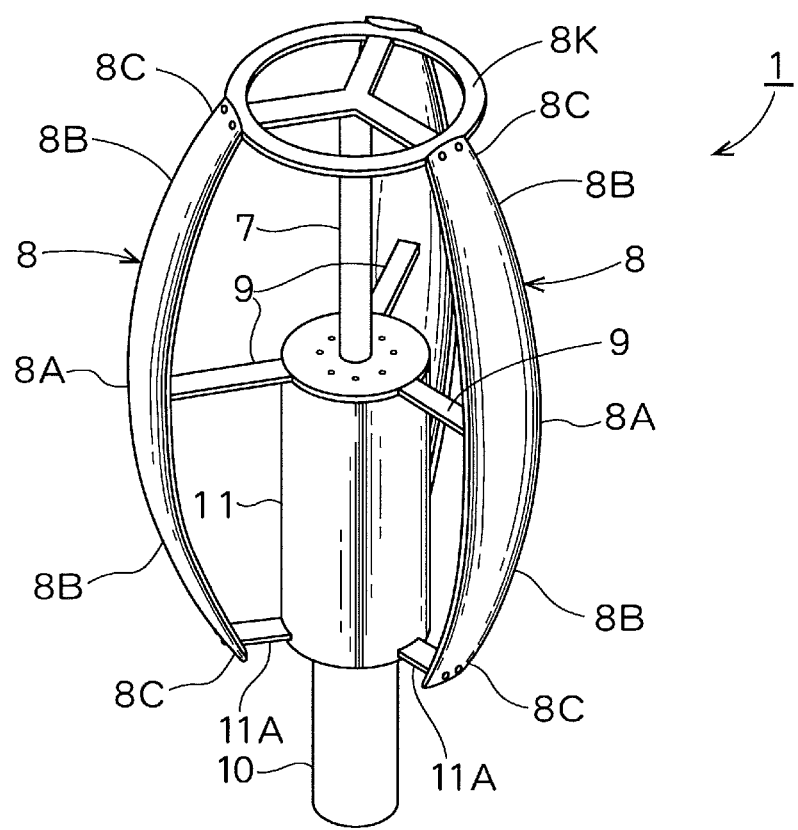
FIG. 17 is a perspective view showing Example 7 of the vertical shaft wind turbine according to the present invention.

FIG. 16 is a perspective view showing Example 6 of the vertical shaft wind turbine. The same members as the previous example are designated by the same reference signs, and the description thereof will be omitted.

In FIG. 16, a generator (not shown) is fixed to an upper end of the support column 10, and the lower part of the vertical main shaft 7 penetrates an inside of the generator and is rotatably supported on an upper surface of the support column 10.

A cylindrical mounting member 11 is fixed to the lower part of the vertical main shaft 7 so as to cover a generator (not shown). Inside the cylindrical mounting member 11, a permanent magnet is fixed to the vertical main shaft 7 so as to correspond to a power generation coil, and the permanent magnet rotates together with the vertical main shaft 7 to generate an electric current in the power generation coil.

The tip of the inwardly curved inclined part 8B of the blade 8 is fixed to a projecting piece 11A at a lower part of an outer peripheral surface of the cylindrical mounting member 11, and the tip of the upper inwardly curved inclined part 8B is fixed to an annular mounting member 8K fixed to the upper end of the vertical main shaft 7.

The support arm 9 is protruded from the upper outer peripheral surface of the cylindrical mounting member 11 toward the main part 8A of the three blades 8, so that deflection does not occur even if the blade 8 is long.

Figure 18:
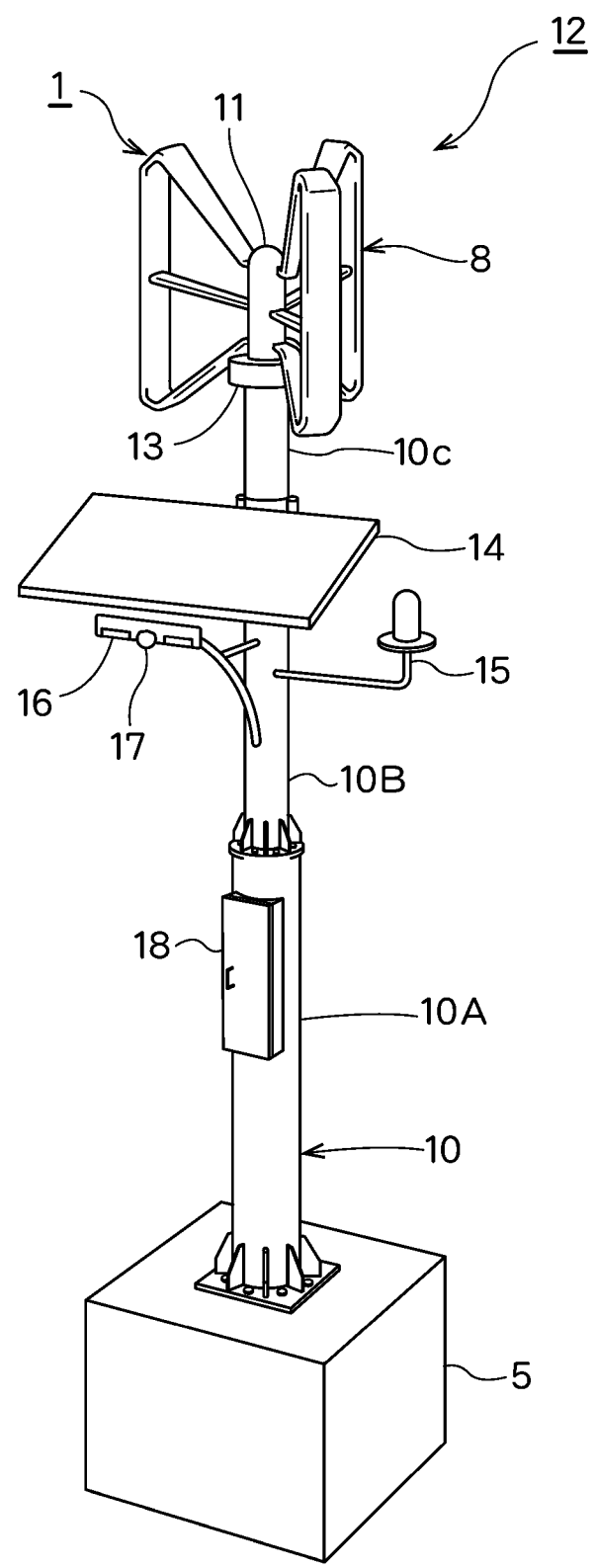
FIG. 18 is a perspective view of the wind power generator using the vertical shaft wind turbine according to the present invention.

FIG. 18 is a perspective view of the wind power generator 12 equipped with multiple functions. In the support column 10 erected on the support base 5, a storage battery (not shown) is arranged inside the lower pipe 10A. Various electric cords are arranged in the middle pipe 10B and the upper pipe 10C.

The cylindrical mounting member 11 is supported on the upper pipe 10C via a vibration control device 13. A generator (not shown) and a vertical main shaft connected to the generator are erected inside the cylindrical mounting member 11, and the lower part of the vertical main shaft is rotatably supported inside the upper pipe 10C. The blades 8 are fixed to the outer peripheral surface of the cylindrical mounting member 11, and various electric cords are wired between the generator and the storage battery.

A solar power generator 14 is fixed to the middle pipe 10B, and a current collecting cord (not shown) is connected to the storage battery in a lower portion through inside the middle pipe 10B.

An antenna 15 for wireless data communication (LTE, WIFI) powered from the storage battery, an automatic illumination lighting 16, and an automatic monitoring camera 17 are provided at the middle pipe 10B.

A comprehensive control device 18 is arranged on an outer surface of the lower pipe 10A, power is supplied from the storage battery, and wirings are linked with the antenna 15, the automatic illumination lighting 16, and the automatic monitoring camera 17. In addition, the comprehensive control device 18 is unitized so as to control them according to predetermined setting data.

The comprehensive controller 18 comprises as follows;

(1) Communication modem (LTE, BCDMA, WIMAX, optical, etc.) and a IoT controller.

(2) LIFF RECORDER, picture recording without power supply, event picture recording, original recording (MICRO, SD), recording server storage, etc., ESS controller.

(3) ESS and BMS, available as an emergency power source in an emergency, available even without a power supply (power failure).

(4) Bluetooth (registered trademark), antenna, etc. for control and management of the wind power generator by APP.

These are deployed as telegraph units.

Application examples of this telegraph unit are as follows in the area where the wind power generator 12 is installed;

(1) A WIFI station can use WIFI anywhere in an emergency. Business person can use the WIFI station anywhere as an early detection of disasters, crime prevention, emergency power supply in an emergency, etc. through recording/taking-out of image data indoors/outdoors by a WIFI camera having merits of reducing a net usage fee and a land inspection construction cost.

(2) A IoT station (for business use) is possible to distribute and receive advertisements, bus stops, and various other information via the antenna 15. It is possible to perform a control by collecting/transmitting information from various sensors, various meters, control devices, etc.

A IoT station (for residential use) is possible to perform constantly monitoring and guarding the area around the house with a monitoring camera. It is possible to perform the instruction of check, control, and management by APP.

(3) The IoT station (for agriculture) is possible to perform the observation of livestock growth, harmful animals, sudden climate changes, etc. using camera images. It is possible to perform measurement/management of temperature, humidity, CO2 concentration, luminosity, rainfall, etc., and watering management by APP.

(4) The IoT station (for ranch management) is possible to grasp the current state of the ranch using a camera. It is possible to perform a confirmation of livestock location, health/growth observation of individual and flock, management of lot/shipping.

This generator can be small and lightweight, so that it is suitable as a power source for parks, agricultural roads, mountain roads and other street lights.

The blade 8 is not limited to a wind turbine, but can also be used for a water turbine.

INDUSTRIAL APPLICABILITY

Since the vertical shaft wind turbine of the present invention is easy to start rotating, it can efficiently rotate even with respect to intermittently blowing wind, and is advantageously used as a wind turbine for a wind power generator. The blade can also be used for a water turbine to obtain a high effect.

REFERENCE SIGNS LIST 1. vertical shaft wind turbine
2. column
3. horizontal frame
3A. outer frame
3B. support bar
4. support frame
5. support base
6. generator
6A. bearing
7. vertical main shaft
7A. 7B. mounting member
8. vertical blade
8A. main part
8B. inwardly curved inclined part
8C. end
8D. inner side surface
8E. outer side surface
8F. front edge
8G. rear edge
8H. bolt
8J. extension part
8K. annular mounting member
9. support arm
10. support column
10A. lower pipe
10B. middle pipe
10C. upper pipe
11. cylindrical mounting member
11A. projecting piece
12. wind power generator
13. vibration control device
14. solar power generator
15. antenna
16. lighting
17. monitoring camera
18. comprehensive control device
A. string length
G. base
r. radius of rotation
t. thickness

What is claimed is:

1. A vertical shaft wind turbine comprising:
a plurality of blade sets, wherein each blade set comprises at least two vertical blades,
wherein, for each vertical blade,
the vertical blade comprises a vertical main part, an upper inwardly inclined part and a lower inwardly inclined part,
the vertical main part extends in a vertical direction which is defined by a rotational axis of a vertical main shaft of the wind turbine, the vertical main part has upper and lower ends that merge with the upper and the lower inwardly inclined parts, respectively, such that the vertical main part is centrally located in the vertical direction between the upper and the lower inwardly inclined parts,
the upper inwardly inclined part has a tip on an end thereof opposite from the vertical main part, the upper inwardly inclined part extends from the upper end of the vertical main part diagonally upward and linearly toward the vertical main shaft,
the lower inwardly inclined part has a tip on an end thereof opposite from the vertical main part, the lower inwardly inclined part extends from the lower end of the vertical main part diagonally downward and linearly toward the vertical main shaft,
the tip of the upper inwardly inclined part is fixed to an upper mounting member which is fixed to an upper part of the vertical main shaft, and the tip of the lower inwardly inclined part is fixed to a lower mounting member which is fixed to a lower part of the vertical main shaft, such that the vertical blade is rigidly fixed to the vertical main shaft of the wind turbine and such that the vertical blade rotates with the vertical main shaft when the vertical main shaft rotates about the rotational axis in a rotational direction, the vertical blade is formed such that a chord length and a thickness of the vertical blade are continuously reduced from the upper and the lower ends of the vertical main part, respectively, to each of the tips of the upper and the lower inwardly inclined parts, and, in the vertical direction, the chord length of the vertical blade is greatest centrally between the upper and the lower ends of the vertical main part, and a cross sectional shape of the vertical main part is an airfoil shape, and the vertical main part of the vertical blade has a chord length that is in a range of 45% to 55% of a radius of rotation of the vertical main part, the radius of rotation being a distance from the rotational axis to a chord of the vertical main part, wherein the blade sets are arranged in layers in the vertical direction, the layers of blade sets including at least a blade set of a lower layer and a blade set of an upper layer, wherein tips of upper inwardly inclined parts of the blade set of the lower layer are positioned midway, in the vertical direction, between tips of upper inwardly inclined parts of the blade set of the upper layer and tips of lower inwardly inclined parts of the blade set of the upper layer, and wherein the tips of the lower inwardly inclined parts of the blade set of the lower layer are positioned below, in the vertical direction, the tips of the lower inwardly inclined parts of the blade set of the upper layer.

2. The vertical shaft wind turbine according to claim 1, wherein each blade set of the plurality of blade sets comprises three vertical blades.

\* \* \* \* \*